(12) United States Patent
Lemay et al.

(10) Patent No.: US 10,642,752 B2
(45) Date of Patent: May 5, 2020

(54) AUXILIARY PROCESSOR RESOURCES

(71) Applicant: Intel Corporation, Santa Clara, CA (US)

(72) Inventors: Michael Lemay, Hillsboro, OR (US); Steffen Schulz, Darmstadt (DE)

(73) Assignee: INTEL CORPORATION, Santa Clara, CA (US)

( * ) Notice: Subject to any disclaimer, the term of this patent is extended or adjusted under 35 U.S.C. 154(b) by 9 days.

(21) Appl. No.: 15/663,223

(22) Filed: Jul. 28, 2017

(65) Prior Publication Data

US 2019/0034350 A1    Jan. 31, 2019

(51) Int. Cl.
| | | |
|---|---|---|
| *G06F 12/14* | (2006.01) | |
| *G06F 9/46* | (2006.01) | |
| *G06F 12/1045* | (2016.01) | |
| *G06F 12/1009* | (2016.01) | |

(52) U.S. Cl.
CPC ...... *G06F 12/1045* (2013.01); *G06F 12/1009* (2013.01); *G06F 2212/656* (2013.01); *G06F 2212/657* (2013.01); *G06F 2212/682* (2013.01)

(58) Field of Classification Search
CPC ............... G06F 12/1441; G06F 12/109; G06F 12/0623; G06F 12/1036; G06F 12/1491; G06F 12/1045
See application file for complete search history.

(56) References Cited

U.S. PATENT DOCUMENTS

| | | | | |
|---|---|---|---|---|
| 3,771,146 A * | 11/1973 | Cotton | ................ | G06F 12/1483 710/260 |
| 4,121,286 A * | 10/1978 | Venton | .................... | G06F 9/468 |
| 4,408,274 A * | 10/1983 | Wheatley | ............ | G06F 12/1483 711/163 |
| 4,677,546 A * | 6/1987 | Freeman | ............. | G06F 12/1491 711/201 |
| 6,880,068 B1 * | 4/2005 | McGrath | ............. | G06F 9/30043 712/220 |
| 7,281,102 B1 * | 10/2007 | Agesen | ................. | G06F 12/145 711/163 |
| 7,487,313 B1 * | 2/2009 | Agesen | ............... | G06F 12/1036 711/150 |
| 9,747,218 B2 * | 8/2017 | Godard | ............... | G06F 12/0875 |
| 2007/0294496 A1 * | 12/2007 | Goss | .................... | G06F 12/1408 711/163 |
| 2014/0281380 A1 * | 9/2014 | Sodhi | .................. | G06F 9/30123 712/30 |
| 2016/0232105 A1 * | 8/2016 | Goss | ...................... | G06F 21/575 |

* cited by examiner

*Primary Examiner* — Hyun Nam (74) *Attorney, Agent, or Firm* — Schwabe, Williamson & Wyatt, P.C.

(57) ABSTRACT

Apparatuses, systems and methods associated microprocessor segment registers are disclosed herein. More particularly, the present disclosure relates to providing an auxiliary segment register(s) and/or auxiliary segment descriptor table (s), and various ways for their use, for example, providing new instructions for their access, or remapping existing processor resources. A machine might provide isolated execution regions and/or protected memory by associating or exclusively reserving some or all of the auxiliary segment register(s)/table(s) with a specific task, program, instruction sequence, etc. In some embodiments, such as in Internet of Things (IoT) or wearable devices, auxiliary resources may be employed to isolate mutually-distrustful code regions to facilitate engaging unknown devices. Other embodiments are also described and/or claimed.

19 Claims, 5 Drawing Sheets

AUXILIARY PROCESSOR RESOURCES

TECHNICAL FIELD

The present disclosure relates to the field of microprocessor segment registers. More particularly, the present disclosure relates to the implementation of segment registers to facilitate implementation of trusted execution environments and protected address spaces.

Background and Description of Related Art

Modern computer systems use different techniques for managing the memory of the computer system. Memory is typically used for storing information or for storing program instructions for the computer system. Memory management allows the operating system of the computer system to create simplified environments for running programs.

A common technique used in modern computer systems for memory management is segmentation. Segmentation divides the memory of the computer system into sections called segments. Each segment is an independent, protected region of memory that has common attributes. For example, all of the code for an application program may be contained in a single segment, or an operating system table may reside in a single segment. Further, each application program can be allocated several segments for its use.

Segment registers are used to identify the memory region addressable for a particular segment. Each segment register indexes an associated segment descriptor, when the microprocessor is in protected mode. Each segment descriptor includes a base address, a segment limit, and protection attributes for a particular segment. The base address is the beginning address of the segment, and the segment limit defines the valid range of memory addresses available. When a segment register is initialized an associated segment descriptor is retrieved. Segment descriptors are generally stored in a segment descriptor table located in system memory.

Segmentation can be used to control memory access by implementing segment based memory addressing. When memory is accessed, an address is formed by adding an offset to the base address of the segment. This provides the beginning address for the memory access. For more information on segmentation see Pentium® Processor Family Developers Manual, Intel Corporation, 1995, Chapter 3.

The foregoing background description provided is for the purpose of generally presenting a context for the following disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note also that while the present disclosure may refer to a processor in the singular, this is for expository convenience only, and one skilled in the art will appreciate multiple processors, processors with multiple cores, virtual processors, etc., may be employed to perform the disclosed embodiments.

Figure 1:
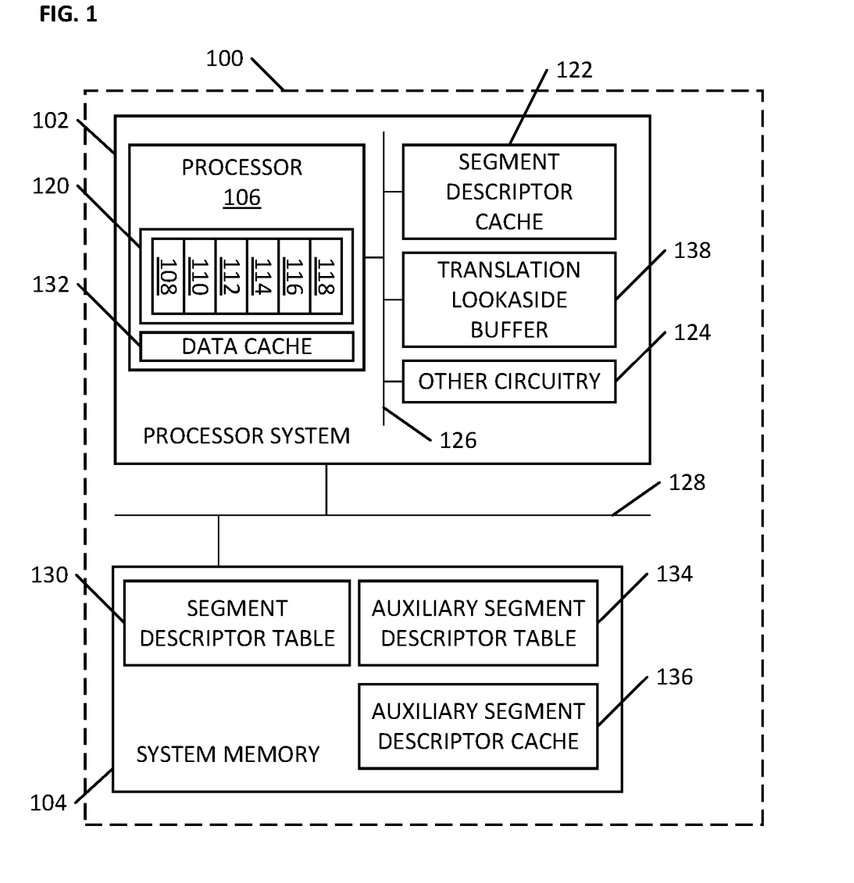
FIG. 1 illustrates portions of an exemplary computer system employing a segmented memory system.

FIG. 1 illustrates portions of an exemplary computer system 100, according to one embodiment, that employs a segmented memory model. The system includes a processor system 102, and a system memory 104. The processor system includes a processor 106 including six exemplary segment registers 108-118 located in a general purpose register file 120. It will be understood by one skilled in the art that these segment registers do not have to be located in the general purpose register file 120, but rather, can be placed in a special register file. It is assumed the processor 106 conforms to the Intel® "X86" processor architecture which is described in detail in a number of published specifications. See, for example, the Intel® 64 and IA-32 Architectures Software Developer's Manual (Vols. 1-4) (Intel® SDM) available at Internet Uniform Resource Locator (URL) Intel.com/products/processor/manuals.

Segment registers 108-118 are used to identify a memory region addressable for a particular segment. For a program to access a segment, a segment selector for the segment is loaded in one of the segment registers. Although a system can define thousands of segments, in a conventional Intel® based processor, only six segment registers are available for immediate use. Other segments can be made available by loading their segment selectors into these registers during program execution. For an Intel® processor in protected mode, segment registers are used to index associated segment descriptors. When a segment register is initialized, an associated segment descriptor is retrieved.

The processor 106 may also manage a segment descriptor cache 122. Every segment register may have a "visible" part and a "hidden" part. The hidden part is sometimes referred to as a segment descriptor cache (or "shadow register"). When a segment selector is loaded into the visible part of a segment register, the processor also loads the hidden part of the segment register with the base address, segment limit, and access control information from the segment descriptor pointed to by the segment selector. The information cached in the segment register (visible and hidden) allows the processor to translate addresses without taking extra bus cycles to read the base address and limit from the segment descriptor. It will be appreciated the segment descriptor cache may be implemented as circuitry, as illustrated, in a processor that may be configured to automatically cache segment descriptors without software intervention. However one skilled in the art will appreciate caching segment descriptor information may also be performed using software instructions to load segment descriptors into segment registers as needed.

As will be understood by one skilled in the art, communication between components of processor system 102, such as between the processor 106 and a segment descriptor cache, is much faster than communication between, for example, the processor and system memory 104. While the illustrated embodiment only shows a processor system 106 in communication with exemplary circuitry 122, 138, one skilled in the art will understand the processor system may include other components 124 such as a data cache or other circuitry that may be on-die or tightly-coupled to the processor. Processor system 102 may be packaged as a single integrated circuit, e.g., a System-on-a-Chip (SoC), or as circuitry sharing a high-speed bus 126.

Devices within the computer system 100 are interconnected by way of one or more communication buses (or data pathways) generally referenced herein as bus 128. For clarity of presentation, the many bus types and data pathways that may be used to interconnect computer system parts are not illustrated. In the illustrated embodiment, the processor system 102 communicates over the bus with system memory 104. As will be appreciated by one skilled in the art, a processor system 102 has an associated processor bus (not illustrated) on which addresses may be placed to select individual memory locations in system memory. The addresses on a processor bus are typically referred to as physical addresses. The processor 106 may implement a memory management architecture modeling system memory as a set of memory segments.

Segment information is maintained by the processor 106 in a segment descriptor table 130 in system memory. To improve memory access performance, as noted above some processor configurations may cache segment information from the segment descriptor table in the segment descriptor cache 122. If processor support is not available, an executing program may instead use appropriate processor instructions to manage loading segment descriptors into segment registers. Data from system memory 104 may also be cached in a data cache 132. For example, when a processor 106 is operating in protected mode, all memory accesses are directed through segments with descriptors originating from either the global descriptor table (GDT) or (an optional) local descriptor table (LDT) as shown.

It will be appreciated these tables may be stored in the same table such as the illustrated segment descriptor table, or they could be separate tables. The segment descriptor table (or tables) contains entries called segment descriptors that provide the base address of segments well as access rights, type, and usage information. If support is available, segment descriptors may be cached in the segment descriptor cache 122. It will be appreciated there could be separate caches for multiple different segment descriptor tables, and caches may be disposed within a processor, packaged with a processor, or otherwise communicatively coupled with a processor. The segment descriptor table 130 (or tables, e.g., global, local, and interrupt) may be stored in different tables in system memory 104 and/or stored in various non-transitory external storage media, such as disk drives, for use in a system employing memory paging.

In some embodiments, an auxiliary segment descriptor table (ASDT) 134 may be provided to extend use of segment descriptors beyond those (e.g., Segment Descriptor Table 130) provided in a typical processor system 102. As will be discussed in more detail below, for certain task types the segment register typically provided by a processor are either insufficient or too inefficient to get certain tasks accomplished. Various disclosed embodiments provide ways to augment a processor system 102 through addition of the ASDT and associated instructions and/or programming conventions so that the ASDT may be used to access memory by way of auxiliary segment registers. As with the Segment Descriptor Table 130 being cached by a Segment Descriptor Cache 122 (if available), it will be appreciated there could also be a separate auxiliary segment descriptor cache 136 for the auxiliary segment descriptor table 134. And although FIG. 1 illustrates the auxiliary segment descriptor cache disposed in system memory 104 it will be appreciated it may be located at another location within the system 100 providing faster access to the table than provided by system memory. In embodiments discussed further below, the ASDT 134 may be used to facilitate implementation and use of trusted execution environments (TEE) by reserving specific ASDT segments for use by, for example, a particular TEE.

If an ASDT is available, tasks may benefit from using additional (possibly dedicated) Segment Descriptor Table entries for performing a task. For example, some systems may include hardware and/or software components to defend against attack. It will be appreciated there can be different types of attacks and different levels of protection, e.g., against software attacks by software executing on a device (or introduced to a device from another device such as when IoT devices interact), or against hardware attacks. Exemplary environments support implementing portions of a trusted execution environment (TEE) such as the Intel® Trusted Execution Technology (TXT), Intel® LaGrande Technology, the Intel® SGX Software Guard Extensions, Intel® vPro, ARM TrustZone, the AMD Secure Execution Environment, or AMD Platform Security Processor. Trusted execution technology (TET) may include one or more processor capabilities and/or specialized software services or hardware, e.g., special processor registers, segments, data areas, and specific support hardware such as an Intel Trusted Platform Module (TPM), to assist with various cryptographic functions for securing and validating code and/or data within execution environments. Familiarity with a TEE, TET and TPM-related standards such as ISO/IEC 11889-1: 2015 is assumed. One skilled in the art will appreciate a TPM and/or other security infrastructure may validate content and/or data to be accessed or loaded into memory, as well as confirm an execution environment is performing correctly, e.g., that no intervening module, code, device, etc. is tampering with device execution. The TEE, TET, TPM, and other trust enabling technology referenced herein and related thereto will be collectively referenced in the following claims as "a trusted execution component" which it will be appreciated may be implemented in circuitry, as software, or some combination of both.

Figure 2:
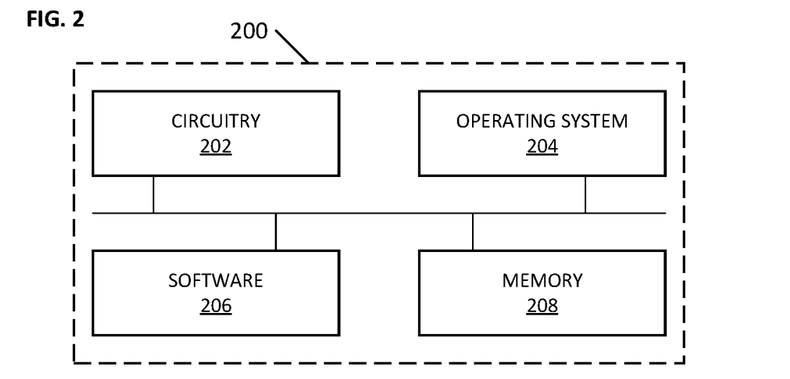
FIG. 2 illustrates a system supporting segmented memory and trusted computing.

FIG. 2 illustrates, according to one embodiment, a system 200 supporting segmented memory and trusted computing environments. Circuitry 202 may include a processor system such as FIG. 1 item 102, and as discussed above circuitry may include (or be associated with) components such as ASICs, ASSPs, SoC, PGAs, FPGAs, DSPs, etc. The circuitry may support executing an Operating System 204 (OS) to provide functionality designed by the OS manufacturer, as well as to support functionality provided circuitry 202 and/or software 206 associated with the system 200, e.g., an installed program. Operating systems may provide different address spaces that include physical memory 208 (for example, FIG. 1 memory 104) corresponding to memory that is actually installed within a device accessed by circuitry 202, a processor system 102, or other components within the system.

In modern computing devices, circuitry 202 and processor system 102 are typically so fast that a lot of time is wasted waiting for information to become available. For example, a processor's ability to access resources, such as memory 104 over a communication pathway such as bus 128 requires the processor 106 to wait for accessing any information originating off-die/not part of the processor system 102. While programs are executing, as mentioned with respect to FIG. 1, caching may be employed to help improve program operation, see, e.g., caches 122, 132. Most caches employ high-speed communication pathways with the processor. During execution of a program the program typically has control of a limited number of processor segment registers associated with the segment descriptor table 130. As appreciated by one skilled in the art, segments are specific areas in a program that may contain data, code and stack. Exemplary segments include the Code Segment (CS) (includes program instructions to be executed), a Data Segment (DS) (includes data, constants that were defined in a program, scratch memory, etc.), and a Stack Segment (SS) (includes data and return information, such as addresses of functions, procedures, and subroutines). A processor 106 may include registers (or segment registers) 108-118 that store a starting address for a segment, and in combination with an offset value, may be used to reference a location within a segment.

As it is often necessary to translate between physical memory addresses and the memory model in use in the operating system, e.g., virtual memory. Individually, time necessary to translate one memory address reference is not computationally taxing. However, when thousands are being made during program execution, this may slow down program execution. In order to improve address lookups to assist with program execution, a Translation Lookaside Buffer 138 (TLB) may be used. The TLB may be implemented in a fast memory area that caches recent mappings between linear (virtual) addresses to physical memory addresses. During program execution, the TLB can be checked to see if it is storing a location in physical memory for a linear (virtual) address. If not then the processor can begin a search for the physical memory as needed.

In addition, depending on the type of system 100 or functionality being provided by the system, it may be necessary to provide a trusted execution environment (TEE). For example, when accessing protected data, such as media corresponding to a movie or data one might have to rent or purchase before access, it is necessary to confirm access rights. However, while trust is sometimes required, in environments where many devices are expected to easily interoperate and exchange data, it is difficult to implement or enforce. For example, Internet of Things (IoT) and wearable technologies are expected to interoperate efficiently, be resilient against security threats, and also selectively and securely share data since IoT devices may contain confidential (possibly statutorily regulated) data needing protection, e.g., health data. In such situations, conventional OS security measures such as user privilege security (Ring ⅔) is not secure enough. Instead it is preferable to provide trusted execution hardware and/or software support.

One approach to managing trusted execution, since there are typically only a few available registers, is to swap segment descriptors from the segment descriptor table 130 in and out of processor segment registers on demand. That is, while executing a program, all of the necessary segment descriptors are loaded prior to the instructions being executed that rely on those descriptors. However, these loading operations take time and resources to perform and when a program is swapping segment descriptors frequently, program performance slows and software manageability may be impacted. One can, in various embodiments, improve performance, compile-time memory allocation and code optimization, as well as application and OS design, if segment registers could be reserved for specific purposes, such as supporting trusted execution environments and/or applications. For example, it would be convenient to designate a single segment register to represent a driver's memory mapped I/O (MMIO) region, data region, and stack, and multiple other segments to represent memory dedicated to communicating with various other software programs on the platform. Intel Architecture (IA) segmentation provides flexible access control for segments, but with current architectures, programs are effectively limited to having just one or two such segments active at the same time. For example, Intel® processors include FS and GS registers, sometimes called "extra" registers since they were added to the processor and left available for use. However, having just a few of these registers does not allow for appreciable offloading of processing complexity or dedicating processing resources as may be desired.

Figure 3:
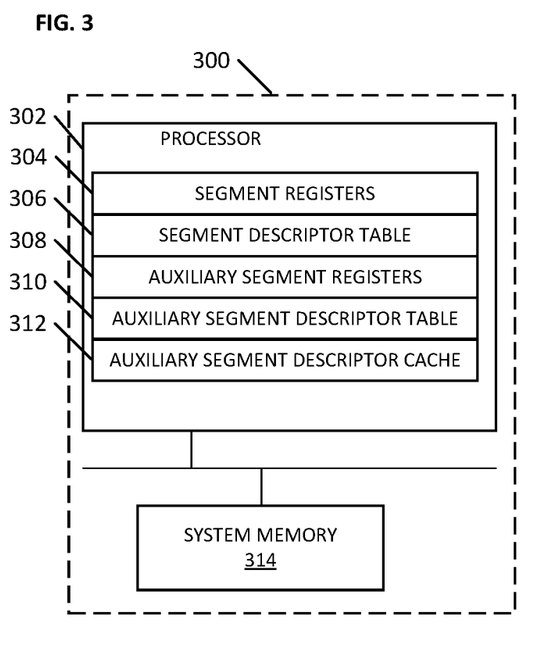
FIG. 3 illustrates a processor system supporting auxiliary technology.

FIG. 3 illustrates a processor system 300, according to one embodiment, supporting Auxiliary Technology. This embodiment could be one implementation of the FIG. 1 processor system 102, in which a processor 302 contains conventional segment registers 304, a segment descriptor table 306 such as FIG. 1 segment descriptor table 130, auxiliary segment registers 308, and an auxiliary segment descriptor table (ASDT) 310. Code, such as FIG. 2 OS 204, or other program instructions executed by the processor 302, may load in a conventional manner using segment registers 304 as required by operating system functions. Depending on the code's instructions, it may operate conventionally, or make use of auxiliary technology. During conventional execution, differing application programs or processes executed by the processor may be allocated differing code segments and data segments within the system memory, see, e.g., FIG. 2 memory 208. The OS loads the code and data segment registers, e.g., within registers 304, 308, in the processor from an appropriate segment descriptor table, e.g., items 306, 310, during context switches between such application programs and processes.

As will be appreciated by one skilled in the art, frequent context switches may materially impact device performance. Auxiliary segment registers 308 may be used to help alleviate overhead and added compiler or program complexity of conventional swapping of a limited number of segment descriptors in and out of processor segment registers. Additional (auxiliary) segment registers will allow some embodiments, for example, to reserve segment registers for specific purposes without unnecessarily complicating compile time memory allocation, code optimization, application speed, Operating System complexity and overhead, etc. For example, a program may select one of the auxiliary segment registers to persistently represent a driver's MMIO region, data region, and stack, and another auxiliary segment register to represent memory dedicated to communicating with other software and/or device components. The term persistent is used to express that rather than swapping out the selected auxiliary segment register for another use as typically done with segment registers, instead it may be assigned to this purpose as long as is desired during execution of a program.

There are multiple options for implementing and accessing auxiliary technology. Processor 302 may have instructions that load segment registers which specify a particular segment descriptor using a segment selector. The segment selector conventionally provides an index into the global or local descriptor table according to the context of the instruction. Such instructions may be extended or new related instructions created to manage utilizing auxiliary segment registers. When loading a segment register 304, 308, the processor 302 computes a physical address for the desired segment descriptor based at least in part on a combination of a segment selector value, byte length of a segment descriptor, and base address of an appropriate descriptor table 306, 310.

It will be appreciated by one skilled in the art that instructions that manipulate conventional segment descriptor tables 306 may be adapted for use with auxiliary segment registers 308 and to work with an auxiliary segment descriptor table 310 if implemented. As will be understood by one skilled in the art, an auxiliary segment register 308 may accommodate a segment descriptor from the conventional or auxiliary segment descriptor tables 306, 310 in accord with, for example, an Intel® architecture segmented memory model. A processor 302 obtains segment descriptors by generating load memory instructions specifying a physical address for a desired segment descriptor. The processor uses information contained in a segment register to generate physical addresses for reading instructions and accessing data during program execution.

In one embodiment, a processor may use a segment descriptor cache within the processor, such as a FIG. 1 item 122 cache, with an auxiliary segment descriptor by transferring a physical address over an address path (not illustrated) interconnecting components of the processor. Each segment descriptor cache entry has a number of bits which can accommodate a block of conventional or auxiliary segment descriptors. It will be appreciated various techniques may be used to index a segment descriptor cache. In one embodiment, a segment selector is used to specify the location of each segment descriptor, and hence the segment selector may be used as an index for the cache. In another embodiment the cache is indexed by memory address. For example, the address of a segment descriptor can be determined based on its selector. It will be appreciated that this has a benefit of removing need to invalidate cache entries on context switches. In one embodiment, different contexts may use different local descriptor tables (LDTs), so a single segment selector reference to a LDT may reference different segment selectors in different contexts. Thus, in an embodiment where the cache is indexed by segment selector, cache entries would need to be invalidated during context switches or tagged with information unique to each context (e.g. an address space identifier). Alternatively, in another embodiment where the cache I indexed by memory address, no invalidation or tagging I needed during context switches, since the differing LDT entries with a colliding selector would be stored at different memory addresses. It will be appreciated that other cache techniques may be employed in other embodiments.

It will be appreciated by one skilled in the art that if a processor provides a segment descriptor cache, similar to having a limited number of segment registers available, there will be a limitation on the number of available cache entries and this may limit performance of certain programs. In the illustrated embodiment, a processor system 300 may include an auxiliary segment descriptor cache 312 to cache entries from a conventional or auxiliary segment descriptor table 306, 310. It will be appreciated that a processor (or controlling program) may use either or both of the auxiliary segment descriptor cache or conventional segment descriptor cache, e.g. FIG. 1 item 122. If a cache line containing a desired segment descriptor is not contained in a segment descriptor cache 122, 312, then the processor fetches that cache line from system memory 314. The processor stores a missed cache line containing a desired segment descriptor into a segment descriptor cache 122, 312.

The FIG. 3 embodiment may be configured to support trusted execution, such as allowing hardware and/or software to perform basic security tasks, including confirm authenticity of a platform and operating system, confirm that an operating system is operating in a trusted state, and provide security features to a process, device, or operating system that may not natively be present therein. Trust requirements in modern devices, particularly when faced with broad interoperability concerns, requires more than simply trusting all code in the system. Trusted execution environments (TEEs) may be used to improve protection of security services and applications in scenarios where large parts of the software stack are owned by untrusted parties or the cost of validating it is too high. Exemplary security services include Device management (identity, updates, key refresh), Secure Storage (key storage, data encryption), Remote Attestation. Exemplary applications include Media applications (e.g., digital rights management (DRM)), Pattern matching/analytics applications (IP protection), Electronic ticketing/payment applications.

As will be appreciated by one skilled in the art, a segment descriptor cache (see FIG. 1 item 122) may have a limited capacity into which segment descriptors (e.g., conventional or auxiliary) can be loaded. The typical approach for managing the typically small conventional segment descriptor cache (also referred to as a segment register file) is to swap segment descriptors into and out of segment registers on demand. In various embodiments, a processor 302 may provide instructions to load a segment descriptor from a specified descriptor table 306, 310 into a segment register 304, 308, and for clearing segment registers.

Figure 4:
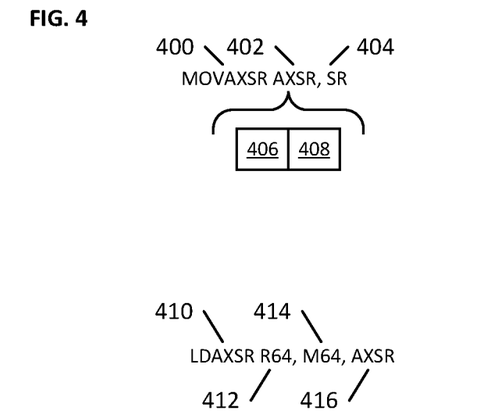
FIG. 4 illustrates processor instructions supporting auxiliary technology.

FIG. 4 illustrates an exemplary move instruction, according to one embodiment, that could be named MOVAXSR 400, for "Move segment register into auxiliary segment register". As discussed above a processor may provide instructions to support auxiliary technology. It will be appreciated that implementing new instructions to directly access auxiliary data will provide improved performance over using existing registers provided by current processor environments. By providing such instructions, drivers, such as TEE drivers, can be assigned to certain auxiliary registers and memory to allow them to execute independently of other processor resources. In one embodiment to do so an instruction can be implemented as MOVAXSR AXSR, SR where, within operand AXSR 402 and SR 404, the location of the AXSR (destination) can be specified by an index into the auxiliary segment register file and the location of the segment descriptor to be loaded SR can be specified by a segment selector operand in which a first bit range 406 within the SR operand indicates a table containing the descriptor and metadata, and a second bit range 408 indicates the index of the segment descriptor within that table. For example, in one embodiment, segment selector operand may be 16-bits in length of which the first portion is 3-bits to identify, for example, whether a local or global request is desired, as well as metadata indicating the requested privilege level to be used when accessing the segment. The second portion is then 13-bits that can identify an index into the segment descriptor table that corresponds to the request type, see, e.g., FIG. 3 item 310. A segment descriptor identified in operand SR 404 is therefore moved into the designated auxiliary segment register.

The illustrated embodiment may similarly define instructions to access memory using auxiliary segment registers, see, e.g., FIG. 3 item 308. For example, such an instruction could be defined as LDAXSR 410 and configured LDAXSR R64, M64, AXSR for "Load memory using an auxiliary segment register" into, for example, a 64-bit register 412 from a 64-bit memory operand 414 relative to the specified auxiliary segment register 416. Analogous to IA32 load instructions, the instruction determines the effective address of memory identified in the segment register. It will be appreciated the operation of segment reads and loads is in accord with conventional segment operations but where the instructions are specifically written to access (if desired) the auxiliary registers and compute addresses accordingly, and (if desired) use the auxiliary segment descriptor cache.

Alternatively, instead of defining variations of conventional segment register operations as illustrated in FIG. 4, in one embodiment, instructions could specify, in accord with use of conventional processor segment registers, a prefix that may be used before memory accesses to indicate to a processor (or other circuitry) to use a segment register identified in the prefix. In one embodiment, a program is capable of modifying operation of a processor so that meanings of certain instruction prefixes could be redefined to select auxiliary segment registers, tables and/or caches. For example, the CS, DS, ES, FS, GS, SS, REP, and REPNE prefixes could be redefined to select auxiliary segment registers 0-7, for the sake of simplicity, assumed selected in that order. A corresponding store instruction could also be defined.

With appropriate processor state preservation, reading and storing operations can be defined to use the conventional instruction prefixes. It will be appreciated by one skilled in the art that this is presented as one exemplary embodiment and that a variety of techniques, direct and indirect, can be defined to access auxiliary segment registers, tables and caches, and the like. Assuming a FIG. 3 context, it will be appreciated that based on instruction context, legacy instructions may use conventional segment registers 304 and descriptor tables 306, and newer programs could use auxiliary segment tables 306, registers 308, and caches 312 directly. In one embodiment, a REX type of prefix (see FIG. 5 discussion) may be used to change how other prefixes are interpreted. In this embodiment, if one did not want to introduce new instructions, a REX prefix is defined which, when utilized, indicates legacy registers CS, DS, etc. would be interpreted as references to auxiliary registers.

In a further embodiment, orthogonal arithmetic instructions could be defined as well. It will be appreciated orthogonal instructions refers to instructions being able to access additional auxiliary segment registers not available to existing instructions, and in some embodiments this means certain bits in an instruction call may determine which registers, auxiliary or not, that are accessed. In one embodiment establishing these orthogonal instructions may be done analogous to how the K* instructions have been defined for performing arithmetic operations on the AVX-512 K registers. (See, e.g., the Intel® SDM.) Thus, similar to the K* instructions, and in accord with the teachings above, we may define AXSR* (auxiliary technology) processor instructions utilizing auxiliary registers. For example, we could define AXSRADD, AXSRMUL, and the like to access memory using auxiliary segment registers and related auxiliary segment descriptor tables (if any) and auxiliary segment descriptor caches.

Figure 5:
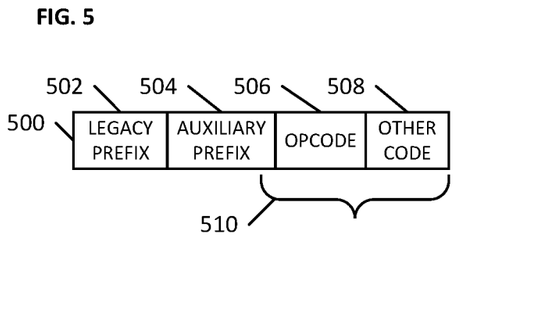
FIG. 5 illustrates a processor instruction supporting auxiliary technology.

FIG. 5 illustrates one embodiment for a new instruction 500 in which illustrated are a legacy prefix 502 one or more bytes in length, auxiliary prefix 504 one or more bytes in length, opcode 506 one or more bytes in length, and other 508 code/instructions/operands that might be needed (if at all) depending on the instruction being implemented. Assuming an Intel® architecture for encoding REX prefixes, a new type of prefix could be defined analogous to the REX prefixes to modify existing IA-32 instructions to access memory using a specified auxiliary segment register. The REX type of instruction and opcode format is described, for example, in the Intel® SDM. As will be appreciated by one skilled in the art, not all instructions require a REX prefix in 64-bit mode. Instead, a prefix is necessary if an instruction references one of the extended registers or uses a 64-bit operand. The REX prefixes may, for example, extend IA-32 by allowing an instruction to specify general purpose registers (GPRs) and Streaming Single Instruction Multiple Data (SIMD) Extensions (SSE) registers. The extension allows, at least in part, for 64-bit operand sizes and specifying extended control registers.

One skilled in the art will appreciate an exemplary Intel® instruction format varies depending on the current processor technology being used. In one embodiment, an instruction has a multi-part format with a varying byte encoding length, where for example there may be a prefix of 0-4 bytes, followed by an opcode of one or two bytes, then a ModR/M of one byte, a SIB of one byte, a Displacement of one byte or word, and an Immediate of one byte or word. In the illustrated embodiment, a similar instruction format may be used in which prefixes of the instruction may be defined to allow accessing other extended auxiliary registers that would not typically be available. Thus, rather than REX prefixes, instead the index/identity of an auxiliary segment register is encoded as part of an auxiliary prefix 504. It will be appreciated by one skilled in the art that the remainder 510 of the illustrated instruction may conform to a REX extension instruction, e.g., it may contain an opcode 506 and other components 508 such as ModR/M, SIB, Displacement, and Immediate.

By using this mechanism, many existing instructions can be promoted to allow the use of auxiliary registers and auxiliary addresses. In an alternate embodiment, instead of identifying an auxiliary segment register in the prefix 504, instead a prefix could simply indicate that the segment override prefixes should be reinterpreted to refer to auxiliary segment registers.

Figure 6:
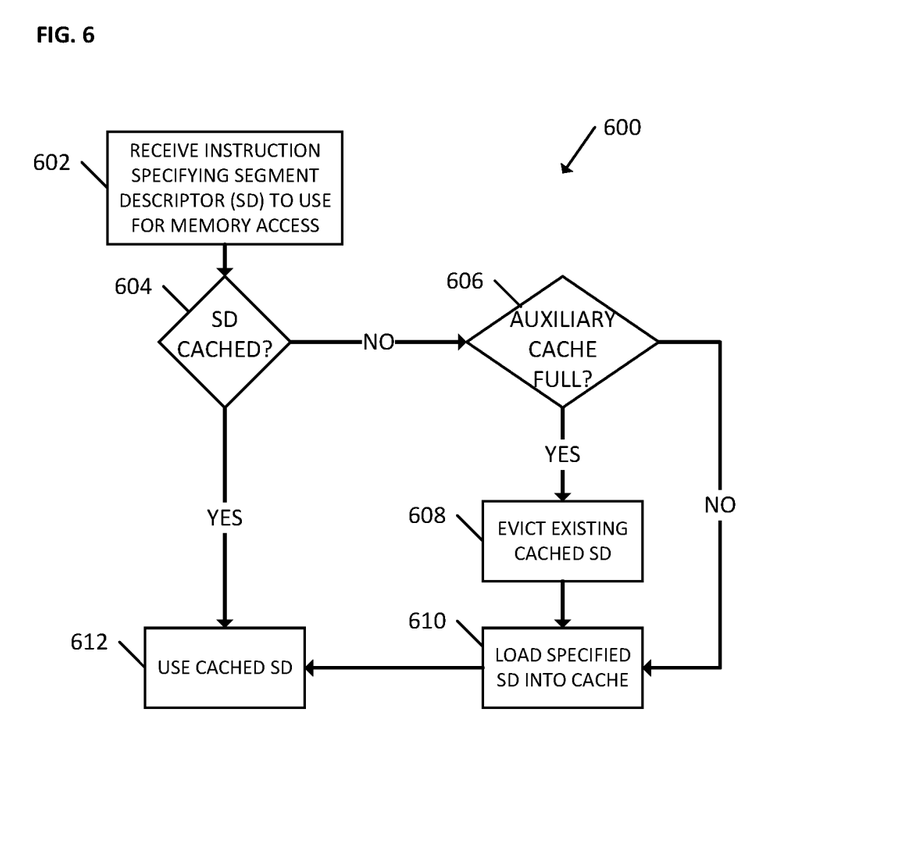
FIG. 6 illustrates a flowchart for loading auxiliary segment descriptor data.

FIG. 6 illustrates a flowchart 600 according to one embodiment for loading auxiliary segment descriptor data using a desired segment descriptor. Rather than explicitly loading auxiliary segment registers with an instruction such as the FIG. 4 MOVAXSR instruction, instead an instruction is received 602 (e.g., decoded) that specifies an auxiliary segment descriptor (SD) to use for memory access.

A test may be performed to determine if 604 the specified segment descriptor is already loaded in a cache, such as a segment descriptor cache (see, e.g., FIGS. 1, 3 caches 122, 136, 312), or other cache or internal processor structure that can store a representation of a segment register or segment descriptor information. It will be appreciated by one skilled in the art that it may be computationally expensive to determine information about a segment, such as its base address, segment-size limit, segment-access attributes (access rights), and the like. Once a segment descriptor's information is identified, subsequent references to the segment descriptor can be stored in a segment descriptor cache to speed up (e.g., into a single instruction step) subsequent references.

In the illustrated embodiment, if 604 the segment descriptor is not already cached, a further test may be performed to determine if 606 all cache entries are currently occupied. Recall that as discussed above, processors provide segment registers, but there are typically very few of them. And in certain execution environments, such as a Trusted Execution Environment, or when running virtualization applications, or other resource intensive tasks, there can be a lot of overhead in switching between operations of various programs, context switches, etc., resulting in repeated loading and unloading of the segment registers. This overhead can overwhelm the resources of a conventional segment descriptor cache such as FIG. 1 item 122, but it can be alleviated through use of auxiliary technology as disclosed herein.

If 606 all cache entries are occupied, then in one embodiment an existing cached segment descriptor entry is evicted 608. It will be appreciated by one skilled in the art there are many different factors that may be considered for determining which entry to evict. In particular, if information is known about the segment descriptors that helps understand how often a particular segment may be accessed, e.g., how often a memory address or memory range may be accessed, in one embodiment a prioritization metric is applied to influence which cache entry or entries to evict. In one embodiment, segment selectors are 16 bits in length, and a 16-bit immediate operand could be used by an instruction, such as LDAXSR, to specify the location of a desired auxiliary descriptor. In this embodiment, we would define an additional (privileged) instruction, such as INVLAXSR, to assist with the eviction 608 and invalidate one or more entries of the segment descriptor cache when the corresponding segment descriptor is updated in memory.

In one embodiment, invalidating cache entries may also be needed when switching contexts, since different contexts may use different descriptor tables and thus should not be able to use cached descriptors from other contexts' descriptor tables. Alternatively, cache entries may be tagged with a context ID or address space ID so that each context is only able to use entries that are tagged with the current context ID without needing to flush the cache during every context switch. Cache invalidation instructions such as INVLAXSR may evict all cache entries or may allow software to specify entries to be invalidated by indicating a context ID, a segment selector, or some other identifier. After evicting 608 a cache entry, the segment descriptor specified in the received 602 instruction may then be loaded 610 and used 612 to complete the requested memory access.

In one embodiment, with the addition of an auxiliary segment descriptor cache, each execution thread or TEE may be associated with different auxiliary segment register contents, and a new XSAVE state component should be defined for these registers.

Figure 7:
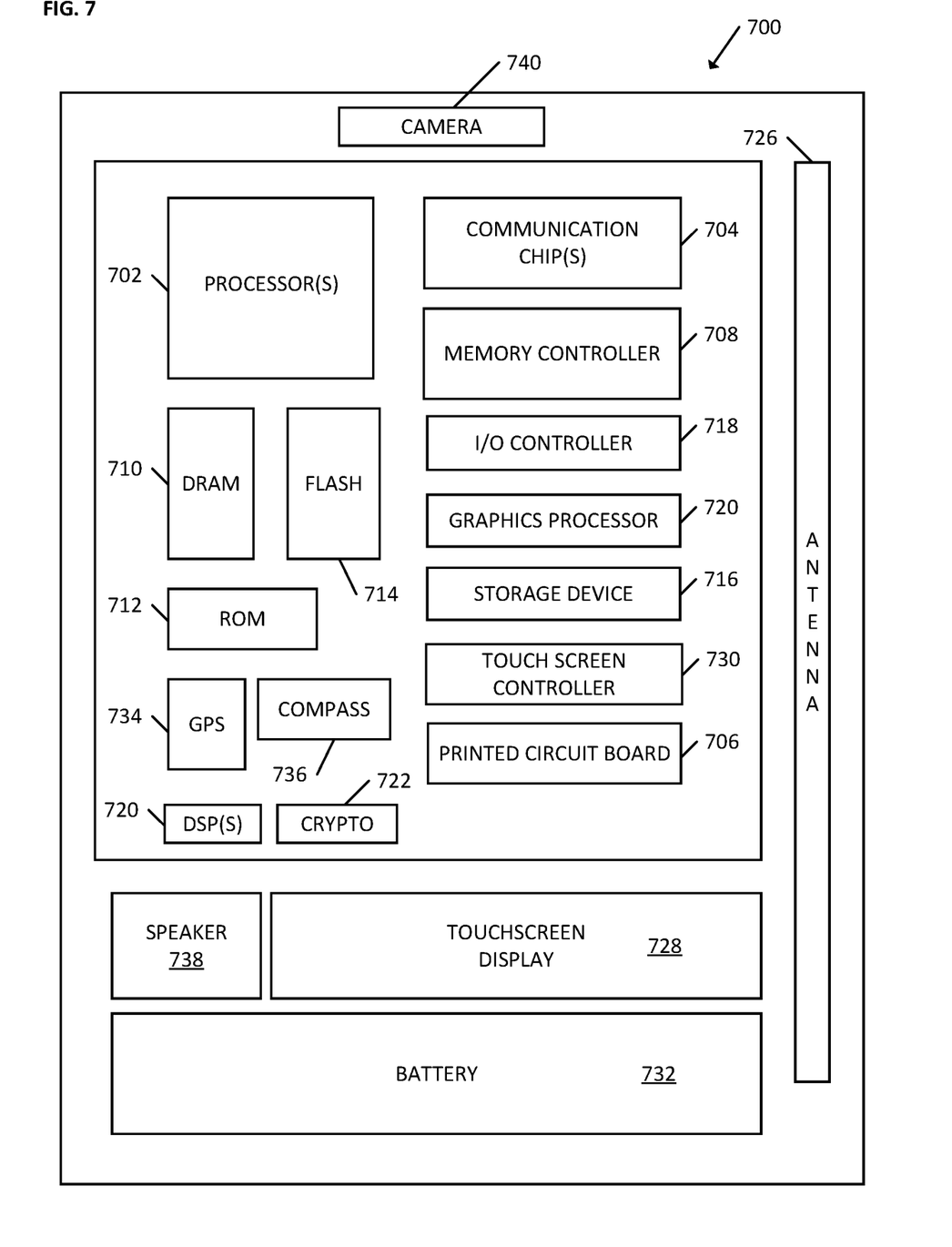
FIG. 7 illustrates an exemplary computer device that may employ the apparatuses and/or methods described herein.

FIG. 7 illustrates an exemplary computer device 700 that may employ the apparatuses and/or methods described herein (e.g., the computer system 100, the trusted computing system 200, the processor system 300), in accordance with various embodiments. As shown, computer device 700 may include a number of components, such as one or more processor(s) 702 (one shown) and at least one communication chip 704. In various embodiments, the one or more processor(s) 702 each may include one or more processor cores. In various embodiments, the at least one communication chip 704 may be physically and electrically coupled to the one or more processor(s) 702. In further implementations, the communication chip 704 may be part of the one or more processor(s) 702. In various embodiments, computer device 700 may include printed circuit board (PCB) 706. For these embodiments, the one or more processor(s) 702 and communication chip 704 may be disposed thereon. In alternate embodiments, the various components may be coupled without the employment of PCB 706.

Depending on its applications, computer device 700 may include other components that may or may not be physically and electrically coupled to the PCB 706. These other components include, but are not limited to, memory controller 708, volatile memory (e.g., dynamic random access memory (DRAM) 710), non-volatile memory such as read only memory (ROM) 712, flash memory 714, storage device 716 (e.g., a hard-disk drive (HDD)), an I/O controller 718, a digital signal processor 720, a crypto processor 722, a graphics processor 724 (e.g., a graphics processing unit (GPU) or other circuitry for performing graphics), one or more antenna 726, a display which may be or work in conjunction with a touch screen display 728, a touch screen controller 730, a battery 732, an audio codec (not shown), a video codec (not shown), a positioning system such as a global positioning system (GPS) device 734 (it will be appreciated other location technology may be used), a compass 736, an accelerometer (not shown), a gyroscope (not shown), a speaker 738, a camera 740, and other mass storage devices (such as hard disk drive, a solid state drive, compact disk (CD), digital versatile disk (DVD)) (not shown), and so forth.

In some embodiments, the one or more processor(s) 702, flash memory 714, and/or storage device 716 may include associated firmware (not shown) storing programming instructions configured to enable computer device 700, in response to execution of the programming instructions by one or more processor(s) 702, to practice all or selected aspects of the methods described herein. In various embodiments, these aspects may additionally or alternatively be implemented using hardware separate from the one or more processor(s) 702, flash memory 714, or storage device 716.

In various embodiments, one or more components of the computer device 700 may implement an embodiment of the FIG. 1 computer system 100 with a the FIG. 3 processor system 300 providing FIG. 2 segmented memory and trusted computing 200 support. Thus for example processor 702 could be the FIG. 1 processor 104 communicating with FIG. 2 memory 208 though memory controller 708. In some embodiments, I/O controller 718 may interface with one or more external devices to receive a data. Additionally, or alternatively, the external devices may be used to receive a data signal transmitted between components of the computer device 700.

The communication chips 704 may enable wired and/or wireless communications for the transfer of data to and from the computer device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 704 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 700 may include a plurality of communication chips 704. For instance, a first communication chip 704 may be dedicated to shorter range wireless communications such as Wi-Fi and Bluetooth, and a second communication chip 704 may be dedicated to longer range wireless communications such as GPS, EDGE, GPRS, CDMA, WiMAX, LTE, Ev-DO, and others.

In various implementations, the computer device 700 may be a laptop, a netbook, a notebook, an ultrabook, a smartphone, a computer tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder, or a transportation device (e.g., any motorized or manual device such as a bicycle, motorcycle, automobile, taxi, train, plane, etc.). In further implementations, the computer device 700 may be any other electronic device that processes data.

Figure 8:
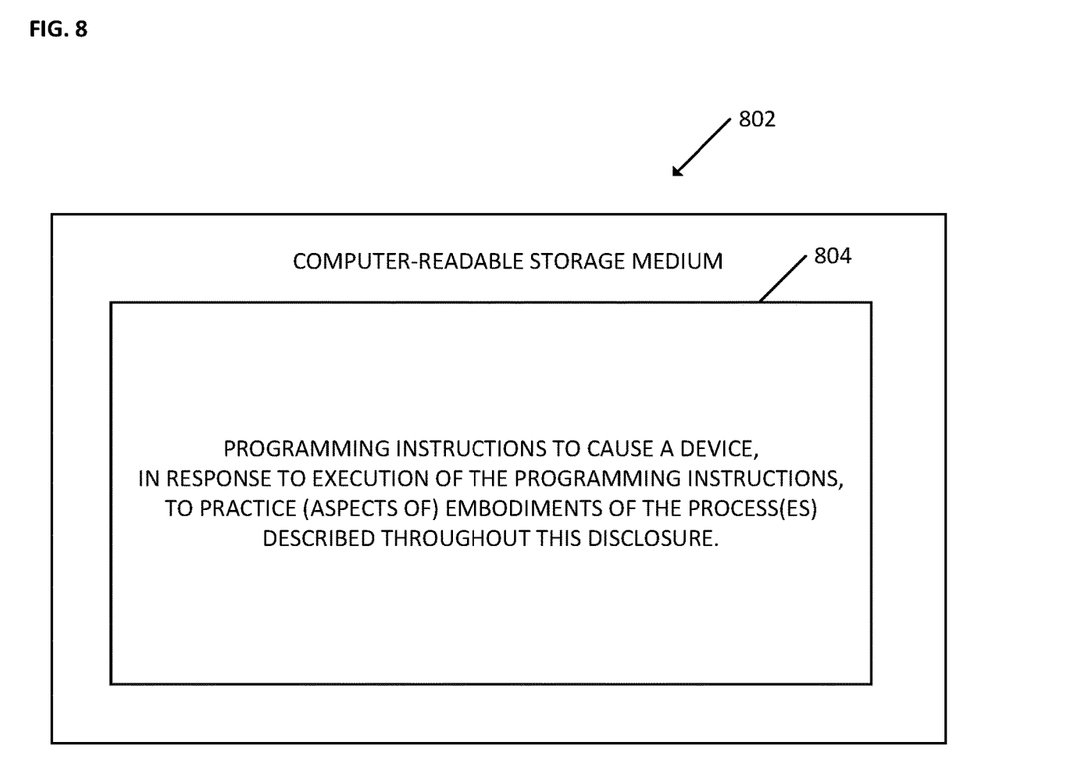
FIG. 8 illustrates an exemplary computer-readable non-transitory storage medium.

FIG. 8 illustrates an exemplary computer-readable non-transitory storage medium that may be suitable for use to store instructions that cause an apparatus, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, non-transitory computer-readable storage medium 802 may include a number of programming instructions 804. Programming instructions 804 may be configured to enable a device, e.g., computer device 700, in response to execution of the programming instructions, to implement (aspects of) the auxiliary technology disclosed herein. In alternate embodiments, programming instructions 804 may be disposed on multiple computer-readable non-transitory storage media 802 instead. In still other embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, by, for example, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute by the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Example 1 may be a machine configurable to provide an isolated execution region, comprising a processor including a segment register having an associated first descriptor of a first segment, the first descriptor to at least identify a first memory region addressable by the segment, and an auxiliary segment register having an associated second descriptor of a second segment, the second descriptor to at least identify a second memory region addressable by the second segment that is isolated from the first memory region; a first segment register; and a first instruction of the processor to load the first descriptor into the first segment register.

Example 2 may be example 1 wherein the isolated execution region comprises the second memory region.

Example 3 may be any of example 1 or example 2 wherein the second memory region is a protected address space.

Example 4 may be example 1 further comprising a second instruction of the processor to load the second descriptor into the first segment register.

Example 5 may be example 1 further comprising a second segment register associated with the auxiliary segment register; and a second instruction of the processor to load the second descriptor into the second segment register.

Example 6 may be any of examples 1-5 further comprising a trusted execution component having exclusive use of the second descriptor.

Example 7 may be example 1, or any of examples 2-6 wherein the first segment register is associated with a first register file used when accessing the first memory region, and the second segment register is associated with a second register file used when accessing the second memory region.

Example 8 may be example 1, or any of examples 2-7, wherein the machine is disposed within an embedded platform.

Example 9 may be a method for a processor, having a segment register file and an associated auxiliary segment register file, to process a series of instructions in an instruction stream, comprising fetching from the instruction stream a first instruction having a first prefix identifying a first segment register associated with a first memory region; and fetching from the instruction stream a second instruction having a second prefix identifying a second segment register associated with a second memory region; wherein the first segment register is part of the segment register file, and the second segment register is part of the auxiliary segment register file.

Example 10 may be example 9 wherein the second prefix may identify registers in either the segment register file or the auxiliary register file.

Example 11 may be example 9 or 10, wherein the second prefix comprises an override to direct the processor to remap an instruction reference to the segment register file to instead reference a corresponding location in the auxiliary segment register file.

Example 12 may be example 9, or examples 10-11, further comprising assigning a segment descriptor associated with the auxiliary segment descriptor table for use by a trusted execution component.

Example 13 may be any of examples 10-12 wherein the assigning the segment descriptor is exclusively assigned to the trusted execution component until released by the trusted execution component.

Example 14 may be example 9, or any of examples 10-13 wherein the second instruction is an orthogonal instruction.

Example 15 may be the example of 14 wherein the second instruction comprises a portion identifying a segment descriptor of the auxiliary segment description table.

Example 16 may be example 9, or any of examples 10-15, further comprising associating the second segment register for exclusive use by a trusted execution component.

Example 17 may be example 9, or any of examples 10-16 wherein the second prefix directs the processor to modify references to the segment descriptor table to be corresponding references to the auxiliary segment descriptor table.

Example 18 may be one or more non-transitory computer-readable media having instructions to provide an isolated execution region that, in response to execution by a machine having at least one processor, cause the machine to associate a first descriptor of a first segment with a first segment register of the processor, the first descriptor to at least identify a first memory region addressable by the segment; associate a second descriptor of a second segment with an auxiliary segment register, the second descriptor to at least identify a second memory region addressable by the second segment that is a protected address space isolated from the first memory region; and load the first descriptor into the first segment register.

Example 19 may be example 18, the one or more computer-readable media of claim 18 further comprising instructions to load the second descriptor into a second segment register associated with the auxiliary segment register.

Example 20 may be example 19, the one or more computer-readable media of claim 18 further comprising instructions to provide a trusted execution component exclusive use of the auxiliary segment register; wherein the first segment register is associated with a first register file used when accessing the first memory region, and the second segment register is associated with a second register used when accessing the second memory region.

Example 21 may be one or more non-transitory computer-readable media having instructions corresponding to an instruction stream that, in response to execution by a machine including at least one processor having at least one segment descriptor table and at least one auxiliary segment descriptor table, cause the machine to fetch from the instruction stream a first instruction having a first prefix identifying a first segment register associated with a first memory region; and fetch from the instruction stream a second instruction having a second prefix identifying a second segment register associated with a second memory region; wherein the first segment register is part of the segment register file, and the second segment register is part of the auxiliary segment register file.

Example 22 may be example 18, or the examples of 19-21, wherein the instructions to fetch the second instruction having the second prefix may identify registers in either the segment register file or the auxiliary register file.

Example 23 may be example 18, or the examples of 19-22, wherein the instructions to fetch the second instruction having the second prefix includes an override to direct the processor to remap an instruction reference to the segment register file to instead reference a corresponding location in the auxiliary segment register file.

Example 24 may be example 21, or any of examples 22-23, the instructions further comprising an orthogonal instruction to assign a segment descriptor associated with the auxiliary segment descriptor table for exclusive use by a trusted execution component.

Example 25 may be example 21, or any of examples 22-24, wherein the second prefix directs the processor to modify references to the segment descriptor table to be corresponding references to the auxiliary segment descriptor table.

Example 26 may be a machine having means for providing an isolated execution region, comprising means for a processor including means for a segment register having an associated first descriptor of a first segment, the first descriptor to at least identify a first memory region addressable by the segment, and means for an auxiliary segment register having an associated second descriptor of a second segment, the second descriptor to at least identify a second memory region addressable by the second segment that is isolated from the first memory region; means for a first segment register; and means for a first instruction of the processor to load the first descriptor into the first segment register.

Example 27 may be example 26 further comprising means for a second instruction of the processor to load the second descriptor into the first segment register.

Example 28 may be example 26 or example 27 further comprising means for a second segment register associated with the auxiliary segment register; and means for a second instruction of the processor to load the second descriptor into the second segment register.

Example 29 may be any of examples 26-28 further comprising means for a trusted execution component having exclusive use of the second descriptor.

Example 30 may be example 26, or any of examples 27-29 further including means for associating the first segment register with means for a first register file used when accessing the first memory region, and means for associating the second segment register with means for a second register file used when accessing the second memory region.

Example 31 may be a method for a processor, having a segment register file and an associated auxiliary segment register file, to process a series of instructions in an instruction stream, comprising means for fetching from the instruction stream a first instruction having a first prefix identifying a first segment register associated with a first memory region; and means for fetching from the instruction stream a second instruction having a second prefix identifying a second segment register associated with a second memory region; wherein the first segment register is part of the segment register file, and the second segment register is part of the auxiliary segment register file.

Example 32 may be example 31 wherein the second prefix comprises means for an override to direct the processor to remap an instruction reference to the segment register file to instead reference a corresponding location in the auxiliary segment register file.

Example 33 may be any of examples 31-32 further comprising means for assigning a segment descriptor associated with the auxiliary segment descriptor table for use by means for a trusted execution component.

Example 34 may any of examples 31-33, wherein the means for assigning the segment descriptor is exclusively assigned to the trusted execution component until released by the trusted execution component.

Example 35 may be any of examples 31-34 wherein the means for second instruction is an orthogonal instruction means.

Example 36 may be any of examples 31-35 further comprising means for associating the second segment register for exclusive use by a trusted execution component.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A machine for computing, comprising:
    a processor including:
        a plurality of segment registers to store a plurality of segment descriptors corresponding to a plurality of memory segments in a memory of the machine, to facilitate access of the memory segments via respective ones of the stored segment descriptors in the segment registers, and
        an auxiliary segment register to extend a number of segment registers of the processor, to store at least on additional segment descriptor corresponding to at least one additional memory segment in the memory, to facilitate access of the at least one memory segment via the stored at least one segment descriptor in the at least one auxiliary segment register;
one or more data registers;
a first move instruction of the processor to move the plurality of segment descriptors into the plurality of segment registers;
a second move instruction of the processor, different in mnemonic from the first move instruction, to move the at least one additional segment descriptor into the auxiliary segment register;
a first load instruction to load data in one of the plurality of memory segments into one of the one or more data registers of the processor, via a corresponding one of the plurality of segment descriptors in the plurality of segment registers; and
a second load instruction, different in mnemonic from the first load instruction, to load data in the at least one additional memory segment into the same or another data register, via the at least one additional segment descriptor in the auxiliary segment register;
wherein the auxiliary segment register, the second move instruction and the second load instruction, together, enable the data in the at least one additional memory segment to be loaded into the same or another data register without having to move the at least one additional segment descriptor into one of the plurality of segment registers, replacing the segment descriptor previously stored therein.

2. The machine of claim 1, wherein the at least one additional memory segment accessed using the at least one additional segment descriptor stored in the auxiliary segment register provides an isolated execution region for the processor.

3. The machine of claim 2, wherein the at least one additional memory segment accessed using the at least one additional segment descriptor stored in the auxiliary segment register is a protected address space.

4. The machine of claim 1, further comprising:
a trusted execution component having exclusive use of the at least one additional segment descriptor stored in the auxiliary segment register.

5. The machine of claim 1, wherein the plurality of segment registers are associated with a first register file used when accessing the plurality of memory segments, and the auxiliary segment register is associated with a second register file used when accessing the at least one additional memory segment.

6. The machine of claim 1, wherein the machine is disposed within an embedded platform.

7. A method for a processor, having a segment register file with a plurality of segment registers, and an associated auxiliary segment register file with at least one auxiliary segment register, associated with the segment register file, to process a series of instructions in an instruction stream, comprising:
moving, with a first move instruction of the processor, a first segment descriptor corresponding to a first memory segment in a memory, into a first of the segment registers of the segment register file;
moving, with a second move instruction of the processor, different in mnemonic from the first move instruction, a second segment descriptor corresponding to a second memory segment in a memory, into one of the at least one auxiliary segment registers of the auxiliary segment register file;
fetching from the instruction stream a first instruction having a first prefix identifying the first segment register in the segment register file;
loading, with a first load instruction of the processor, data from the first memory segment into a first data register, using the first segment descriptor in the first segment register;
fetching from the instruction stream a second instruction having a second prefix identifying an auxiliary segment register in the auxiliary segment register file;
loading, with a second load instruction of the processor, different in mnemonic from the first load instruction, data from the second memory segment into a second data register, using the second segment descriptor in the auxiliary segment register;
wherein the auxiliary segment register, the second move instruction and the second load instruction, together, enable the data in the second memory segment to be loaded into the second data register without having to move the second segment descriptor into one of the segment registers of the segment register file, replacing a segment descriptor previously stored therein.

8. The method of claim 7, wherein the second prefix comprises an override to direct the processor to remap segment register reference in the second instruction, nominally referencing a segment register in the segment register file to reference instead the auxiliary segment register in the auxiliary segment register file.

9. The method of claim 7, further comprising:
assigning the second segment descriptor for use by a trusted execution component.

10. The method of claim 9, wherein the assigning of the second segment descriptor to the trusted execution component is exclusively to the trusted execution component, until released by the trusted execution component.

11. The method of claim 7, wherein the second instruction is an orthogonal instruction.

12. The method of claim 7, further comprising:
associating the auxiliary segment register for exclusive use by a trusted execution component.

13. The method of claim 7, wherein the second prefix directs the processor to modify a reference in the second instruction to the segment register file to reference to the auxiliary segment register file instead.

14. One or more non-transitory computer-readable media having instructions that, in response to execution by a machine having at least one processor, cause the machine to:
move, with a first move instruction of the processor, a first segment descriptor of a first memory segment into a first segment register of the processor, the first segment descriptor to identify the first memory segment;
move, with a second move instruction of the processor, different in mnemonic from the first move instruction, a second segment descriptor of a second memory segment into an auxiliary segment register that extends the first segment register, the second segment descriptor to identify the second memory segment;
load, with a first load instruction of the processor, data from the first memory segment into a first data register, using the first segment descriptor in the first segment register;
load, with a second load instruction of the processor, different in mnemonic from the first load instruction, data from the second memory segment into a second data register, using the second segment descriptor in the auxiliary segment register;

wherein the auxiliary segment register, the second move instruction and the second load instruction, together, enable the data in the second memory segment to be loaded into the second data register without having to move the second segment descriptor into one of the segment registers of a segment register file, replacing a segment descriptor previously stored therein.

15. The one or more computer-readable media of claim 14, wherein the machine is further caused to:
provide a trusted execution component exclusive use of the auxiliary segment register.

16. The one or more computer-readable media of claim 14, wherein the machine is further caused to:
fetch from an instruction stream a first instruction having a first prefix identifying the first segment register; and
fetch from the instruction stream a second instruction having a second prefix identifying the auxiliary segment register;
wherein the first segment register is part of a segment register file having a plurality of segment registers, and the auxiliary segment register is part of an auxiliary segment register file having one or more auxiliary segment registers.

17. The one or more computer-readable media of claim 16 wherein the second instruction having the second prefix includes an override to direct the processor to remap segment register reference in the second instruction nominally referencing the segment register file to instead reference a corresponding location in the auxiliary segment register file.

18. The one or more computer-readable media of claim 16, wherein the machine is further caused to assign the segment descriptor in the auxiliary segment register for exclusive use by a trusted execution component.

19. The one or more computer-readable media of claim 18, wherein the second prefix directs the processor to modify a reference in the second instruction to the segment register file to reference the auxiliary segment register file instead.

* * * * *

UNITED STATES PATENT AND TRADEMARK OFFICE
CERTIFICATE OF CORRECTION

PATENT NO. : 10,642,752 B2
APPLICATION NO. : 15/663223
DATED : May 5, 2020
INVENTOR(S) : Michael Lemay et al.

Page 1 of 1

It is certified that error appears in the above-identified patent and that said Letters Patent is hereby corrected as shown below:

Column 18
Line 64, Claim 1, replace "on" after "to store at least" with "one".

Signed and Sealed this
Twenty-first Day of July, 2020

Andrei Iancu
*Director of the United States Patent and Trademark Office*